(12) United States Patent
Vokinger et al.

(10) Patent No.: US 9,846,063 B2
(45) Date of Patent: Dec. 19, 2017

(54) LINEAR ENCODER HAVING CALIBRATION FUNCTIONALITY

(71) Applicant: HEXAGON TECHNOLOGY CENTER GMBH, Heerbrugg (CH)

(72) Inventors: Urs Vokinger, Au (CH); Heinz Lippuner, Rebstein (CH); Knut Siercks, Mörschwil (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 19 days.

(21) Appl. No.: 14/625,326

(22) Filed: Feb. 18, 2015

(65) Prior Publication Data
US 2015/0233742 A1 Aug. 20, 2015

(30) Foreign Application Priority Data

Feb. 18, 2014 (EP) ..................................... 14155609

(51) Int. Cl.
| | | |
|---|---|---|
| *G01D 18/00* | (2006.01) | |
| *G01B 11/14* | (2006.01) | |
| *G01D 5/14* | (2006.01) | |
| *G01D 5/347* | (2006.01) | |
| *G01D 5/244* | (2006.01) | |

(52) U.S. Cl.
CPC .............. *G01D 18/00* (2013.01); *G01B 11/14* (2013.01); *G01D 5/14* (2013.01); *G01D 5/2449* (2013.01); *G01D 5/24438* (2013.01); *G01D 5/24452* (2013.01); *G01D 5/34723* (2013.01); *G01D 5/34746* (2013.01)

(58) Field of Classification Search
CPC ........................... G01D 18/00; G01D 5/34746

USPC .................................................... 324/207.24
See application file for complete search history.

(56) References Cited

U.S. PATENT DOCUMENTS

| | | | |
|---|---|---|---|
| 4,590,527 A | | 5/1986 | Warner |
| 5,021,650 A | * | 6/1991 | Rieder |
| 5,786,931 A | | 7/1998 | Speckbacher et al. |
| 6,486,467 B1 | | 11/2002 | Speckbacher et al. |
| 6,532,791 B2 | | 3/2003 | Schmid et al. |

(Continued)

FOREIGN PATENT DOCUMENTS

| | | |
|---|---|---|
| DE | 19608978 A1 | 10/1996 |
| DE | 19604502 A1 | 8/1997 |

(Continued)

OTHER PUBLICATIONS

Extended European Search Report dated Jul. 24, 2014 as received in Application No. 14155609.2.

*Primary Examiner* — Walter L Lindsay, Jr.
*Assistant Examiner* — Milton Gonzalez
(74) *Attorney, Agent, or Firm* — Maschoff Brennan

(57) ABSTRACT

A linear encoder can have a mass embodiment having a position code marking, a read head having a calibration means, and a control and analysis unit, and calibration method for calibrating a position code made of code elements using the read head. The read head has a sensor unit having at least two detection reference points, the detection distance of which establishes at least one standard with high precision. In the scope of the calibration method, calibrated position values are prepared for code elements with the aid of the standard, which is determined with high precision, and are stored in the control and analysis unit.

19 Claims, 7 Drawing Sheets

(56) References Cited

U.S. PATENT DOCUMENTS

| | | | |
|---|---|---|---|
| 6,888,126 B2 | 5/2005 | Blasing et al. | |
| 7,475,489 B2 | 1/2009 | Pucher et al. | |
| 7,608,813 B1 | 10/2009 | Milvich et al. | |
| 8,179,129 B2 | 5/2012 | Burkhardt et al. | |
| 2004/0189984 A1 | 9/2004 | Burgshcat et al. | |
| 2011/0218760 A1* | 9/2011 | Takahama | |
| 2015/0144775 A1 | 5/2015 | Vokinger et al. | |
| 2015/0233738 A1 | 8/2015 | Vokinger et al. | |

FOREIGN PATENT DOCUMENTS

| | | |
|---|---|---|
| DE | 197 26 173 A1 | 12/1998 |
| DE | 19919042 A1 * | 11/2000 |
| DE | 10 2006 004 898 A1 | 8/2007 |
| DE | 102008055680 A1 | 4/2010 |
| EP | 1 195 880 A1 | 4/2002 |
| EP | 1 659 373 A1 | 5/2006 |
| EP | 1 882 989 A2 | 1/2008 |
| EP | 2 587 224 A2 | 5/2013 |
| EP | 2 682 718 A1 | 1/2014 |
| EP | 14155582 A | 8/2015 |
| WO | 99/35468 A1 | 7/1999 |
| WO | 01/61280 A1 | 8/2001 |

\* cited by examiner

LINEAR ENCODER HAVING CALIBRATION FUNCTIONALITY

FIELD OF THE INVENTION

Some embodiments of the invention relate to a linear encoder having calibration functionality, a calibration method for such a linear encoder, and such a computer program product.

BACKGROUND

Linear encoders for precise distance measurement are required in many fields of application, in which the position of an element movable along a linear path, for example, the position of a machine component on a linear axis such as drives or pivot arms, is to be determined. The positions detected in this case can be used as position values for measuring purposes, or also for positioning components by way of a drive having a position control loop. Such linear position encoders are accordingly used in devices such as coordinate measuring machines (CMM), geodetic devices, robot arms, or hydraulic actuators. A linear encoder has for this purpose a mass embodiment and a read head for the scanning thereof, which are movable in relation to one another, as well as a control and analysis unit for regulating measurement operations and for assigning a position value, which is recorded by the read head, to a scanning signal. In this case, depending on the requirements and structural options, either the read head is stationary and the mass embodiment is movable, for example, in that the mass embodiment is connected to a movable object, the linear movement of which is to be detected, or the mass embodiment is fixedly positioned and the read head is moved in relation thereto, for example, in that a measuring carriage, which is provided with a read head, of a coordinate measuring machine is moved over a scale carrier attached to a measuring table.

The scanning of the mass embodiment is performed in this case in a contactless manner, generally based on optical, inductive, magnetic, or capacitive physical principles. For example, the read head can have illuminating means, which irradiate a mass embodiment having light-reflective or light-scattering (reflected light scanning) or light-transmitting (transmitted light scanning) markings with light. The light is incident therefrom on a light-sensitive pickup of a sensor, for example, on a photocell or a CCD array. If the mass embodiment has light-reflective markings, the sensor is attached on the same side of the read head as the illuminating means. In the other case, the read head laterally encloses the mass embodiment and sensor and illuminating means are arranged approximately opposite to one another in/at/on the read head. The markings are used as code elements for coding the relative position of the read head in relation to the mass embodiment. The coding can be implemented as an incremental code, for example, by alternating similar light/dark transitions, moiré patterns, or, for measurement methods other than optical measurement methods, as an electrical or magnetic poles, or as an absolute code, for example, by a number of defined different patterns. Combinations of an incremental and absolute partial code are also known, for example, for determining a coarse position and fine position in each case. Possible implementations of an optical position code, for example, are found in patent application EP 12175130.9, for example.

In principle, various materials are suitable as the material for a mass embodiment. Since the code elements are to stand for defined position values, they must actually be located at the location in relation to the read head representing the respective position value. Currently, such mass embodiments are frequently manufactured from steel strips, plastics, glass, or ceramic. The marking is applied with high precision on the mass embodiment for precise localization, which places correspondingly high demands on the production method of the mass embodiment with respect to the manufacturing tolerances, but also, depending on the desired degree of precision, on the calibration procedure required later, which assigns a position value to each code value, which is then typically stored in a storage unit of the linear encoder. It is apparent that after a localization which has been performed once, for example, by code calibration, the code position should remain constant in relation to the read head and should not change. However, in the case of the materials presently typically used for mass embodiments, environmental influences, such as temperature and moisture variations, and also aging processes of the mass embodiment material, result in changes which cause expansion or shrinking of the mass embodiment and therefore stretching or compression of the distances of the code elements to one another. Due to such influences, it can then occur that the position value assigned to a code element by the storage unit no longer corresponds to the actual relative location of read head and measuring rod. In published application DE 19608978A1, using a glass ceramic as the material for the mass embodiment of a light electrical position measuring unit was suggested to avoid such influences.

If tensions arise, as a result of aging or environmental influences, between the material of the mass embodiment and the material of the object accommodating the mass embodiment, for example, a measuring table, the mass embodiment as a whole can thus shift in relation to the read head, whereby the zero point location changes. To counteract such problems, a combination of materials having different coefficients of thermal expansion such that temperature influences cancel out as a whole was proposed (see, for example, DE 19726173 A1). Many of these examples, and also the attempts to compensate for errors caused in this manner mathematically, cf., for example, WO 9935468 A1, require a temperature determination for the correct compensation, however, which presumes a preceding temperature calibration at the producer.

EP 1195880 A1 discloses a method for increasing the positioning precision of a positioning element, which is arranged so it is linearly movable in relation to a read head, of a linear motor, which has a mass embodiment. The mass embodiment has an incremental position code made of magnetic code elements. The read head has a control and analysis unit and at least two sensors spaced apart from one another, which are implemented in this example as Hall sensors and are used for calibrating the positioning element. The distance of the sensors is adapted in this case to the distance which two magnetic code elements on the mass embodiment are to have to one another and is equal thereto in the ideal case. In a calibration run, the positioning element is moved in relation to the read head and code elements are detected by both sensors and output as sensor signals. On the basis of the sensor signals and stored information, target position values are ascertained by the control and analysis unit. In each case a target distance is formed from the difference of that of the two target position values, which result in the case of two positions of the position element, which successively result in an equal sensor signal value at both sensors (within one sine period). Since the actual distance of two such positions corresponds in absolute value to the distance of the two sensors from one another, a target position error is determined from the difference of the target distance and the actual distance. Proceeding from a zero position, this is carried out successively for all successive positions of the positioning element, wherein the preceding difference value is added to the difference value ascertained at the present position in each case.

The method described in EP 1195880 A1 has the disadvantage that the distance of the sensors used as the standard is approximately as great as the marking distances of the incremental position code. This requires a large number of successive steps during the calibration, whereby a large number of error addition steps occur, which cause an uncertainty which increases with the number. In addition, this uncertainty can be amplified by small disturbances in the sensor signal detection, which must be counteracted by error weighting. The apparently required position precision is approximately $>1 \cdot 10^{-4}$, which is inadequate for high-precision position or distance measurements, as are required, for example, in applications such as quality testing, meteorological measurements, geodetic surveying, etc. Further disadvantages are that because of the method, an uncalibrated range remains in existence at the zero position of the device, and the distance of the sensors and the distance of the code elements on the mass embodiment must be adapted to one another. In addition, environmental influences or aging phenomena are not taken into consideration in EP 1195880 A1. Nevertheless, these could cause a change of the distance of the sensors to one another, whereby the error value ascertainment can be corrupted very disadvantageously.

The problem of the present invention is therefore to provide an improved, more reliable linear encoder, and an improved calibration method for such a linear encoder.

This problem is solved, or these solutions are refined, according to the invention by the features of the independent claims and/or by features of the dependent claims.

SUMMARY

The present invention relates to a linear encoder having mass embodiment for high-precision distance measurement, which has a calibration means and a calibration method for calibrating the mass embodiment of the linear encoder. The mass embodiment extends along a linear axis. The mass embodiment has a position code marking made of individual code elements. For this purpose, the code elements have a correspondence, for example, in a bit sequence with associated bar numbers, which are stored in the control and analysis unit. The linear encoder has a read head for detecting the code elements and a control and analysis unit having storage unit and calibration functionality for calibrating the position code marking of the mass embodiment. It is not significant in which form the detection of code elements is performed, for example, by optical, magnetic, inductive, or capacitive detection of code elements implemented in one-dimensional, two-dimensional, or three-dimensional form. All types of code, which permit a determination of an absolute or relative position, are suitable as the coding, for example, maximum sequences, greatly varying binary codes, analog intensity curves, etc.

Read head and mass embodiment are movable in relation to one another along the linear axis of the mass embodiment. For example, the linear encoder can, as a component of a linear motor, have a stationary read head and a mass embodiment, which is fastened on the positioning element of the motor, and can be moved thereby. Alternatively, the mass embodiment, for example, in the case of a linear encoder as part of a coordinate measuring machine, can be mounted immovably and the read head can be movable in relation thereto, for example, along a mounting rail.

The read head has a sensor unit for the preferably contactless scanning of the mass embodiment, for example, for the optical, inductive, magnetic, or capacitive detection of code elements. In preferred embodiments of the linear encoder, the detection is performed optoelectronically or capacitively-electronically. In this case, the sensor unit is implemented such that at least two code elements can be detected thereby in one step, without having to displace the read head in relation to the mass embodiment for this purpose. For this purpose, the sensor unit can have, for example, at least two sensors each having punctiform detection field or at least one sensor having at least one extended detection region, embodied as a surface or line sensor, for example. The sensor unit has at least one first and one second detection reference point. These can be the punctiform detection fields themselves, for example, or zero points of one or more detection regions. The detection in one step, with unchanged relative positioning of the read head in relation to the mass embodiment, is performed so that at least one code element is detected in relation to the first detection reference point and at least one code element is detected in relation to the second detection reference point.

For this purpose, a detection in relation to a detection reference point means that the position of a code element, in particular with respect to the extension direction of the mass embodiment, is detected in relation to the detection reference point. If the mass embodiment has a continuous position code marking, for example, the position reference can be produced in that precisely the code element is detected which is detected in the detection reference point itself, without offset thereto. For example, in the case of an analog, continuous intensity curve and sensor having punctiform detection field, the intensity in the punctiform detection field is merely detected for this purpose. Alternatively, in the case of a discontinuous position code marking (for example, barcode), a code element can be detected in relation to a detection reference point, in that the distance to the detection reference point is determined. In particular in the case of a discontinuous position code marking, for example, made of discrete light-dark transitions, the linear encoder has for this purpose sensors as described, having at least one extended detection region. A distance determination can be performed, for example, in that a signal generated by the detection is compared in its signal strength to a reference signal strength. The reference signal strength is in this case the signal strength which would be detectable in the case of a detection without offset. Such a reference signal strength can be stored in the control and analysis unit or ascertained on the basis of further scans. If a detection is performed optoelectronically, a distance can be produced, for example, by ascertaining the position of a brightness peak on a position-sensitive detector, wherein preferably the detector zero point represents the detection reference point. Alternatively or additionally, if code elements are provided, which are implemented as a pattern, a distance can be determined on the basis of the detected location of one or more patterns. For this purpose, for example, image recognition software can also be used, wherein the patterns are either stored in the control and analysis unit during the calibration or are already stored therein in any case.

The detection reference points are fixed by means of a substrate to one another at a defined distance along the linear axis, whereby at least one detection distance is established. The detection distance is determined for a calibration with high precision having an error of at most $5 \cdot 10^{-6}$ and defines a standard. For the high-precision determination of the detection distance and therefore of the standard, the linear encoder has a precision measuring unit in one embodiment, using which the detection distance is measurable at any time, in particular also during the determination of the relative position of encoder element and read head, wherein the precision measurement is preferably performed optoelectronically. In another embodiment of the linear encoder, the substrate, by means of which the sensors and therefore the detection reference points of the sensor unit are fixed and determined in their positions in relation to one another, is manufactured from a material which is dimensionally-durable and aging-resistant and has a coefficient of thermal expansion having an absolute value in the range of 0 to at most $5 \cdot 10^{-6} K^{-1}$. The standard is then determined with high precision in that the detection distance, i.e., the distance between the two detection reference points, is measured with high precision by the producer before the installation of the sensor unit and stored in the storage and analysis unit as a standard, wherein measurement is preferably performed with a relative error of at most $5 \cdot 10^{-6}$. The linear encoder is thus provided with a standard for the high-precision calibration of the position code by the calibration method according to the invention. In the meaning of the invention, a standard is understood hereafter as a length which is established by a detection distance.

The following steps are performed in the scope of the calibration method:

A code element is detected in relation to the first detection reference point. This is used as the first start code element. Such a first start code element can be in particular an outermost code element on the mass embodiment. In the same step, a second code element is detected in relation to the second detection reference point. If the two detected code elements are each detected without offset in relation to the detection reference points, their real distance to one another corresponds to a detection distance and therefore a standard. If a detection is performed with offset to a detection reference point, the real distance thereof is reduced or increased corresponding to the distance(s) determined in this case to the detection reference point(s).

Proceeding from a start position value of the start code element, a calculated position value for the second code element is mathematically calculated on the basis of the standard. A calculated position value is understood in the scope of the invention as a position value which is mathematically calculated for a detected code element using the standard. If a detection is performed without offset in relation to the detection reference points, thus, for example, the two code elements are located in two punctiform detection fields, which establish the two detection reference points, a calculated position value is calculated by adding a standard to the start position value of the start code element. If a detection is performed with offset to one or both detection reference points, a calculated position value is accordingly calculated by adding a standard and the determined distance(s) (including their corresponding signs) to the detection reference point(s) to the start position value of the start code element. The calculated position value here is therefore the sum of the standard, by which one code element is remote from a start code element, plus the measured offset/the measured distance (including sign) to the detection reference point.

On the foundation of the calculated position value, a calibrated position value of the second code element is generated and stored in the storage unit. A calibrated position value is understood in the scope of the invention as a position value, which is stored in the storage unit for a code element as a "true" position value for the following measuring operations of the linear encoder and which is based on a calculated position value. For example, for this purpose the calculated position value itself can be assumed as a calibrated position value and stored in the storage unit, whereby the calculated position value is thus identical to the calibrated position value. Alternatively, for example, to generate a calibrated position value, a difference between standard and real distance can additionally be taken into consideration.

In a further step, the read head is displaced out of this first position by approximately one standard along the mass embodiment into a second position. In this second position, the second code element is then detectable in the region of the trailing first detection reference point and a further code element, which is arranged on the mass embodiment at a distance of approximately one standard from the second code element, is detectable in the region of the leading second detection reference point.

A calculated or calibrated position value can now be generated for the further code element similarly as for the second code element.

To minimize the number of detection steps and therefore the errors added up with each step, it is advantageous if the standard or the detection distance between two detection reference points is large. It is particularly advantageous if the standard is not less than or equal to the distance of two code elements in relation to one another, but rather has a longitudinal extension which encompasses multiple code elements of the mass embodiment.

A start position value is established for the start code element in the scope of the calibration. In particular, the start position value can be established as the zero point of the position code marking and stored as such in the storage unit. Alternatively, a start position value can be determined on the basis of information stored in the storage unit, for example, by using a stored target position value for the start code element.

By displacing the read head along the mass embodiment, in a similar manner, calibrated position values can be determined on the basis of the standard for further code elements. The read head is displaced in this case so that successively all code elements detected in the course of the displacement are each detected in relation to the leading detection reference point and in relation to the trailing detection reference point. The start code element alone is only detected in relation to the trailing detection reference point and the code element at the end of the displacement is only detected in relation to the leading detection reference point. Thus, a series of detected code elements linked to one another results, which are in a known position in relation to one another on the basis of the defined detection distance and therefore the standard, in particular wherein in the ideal case the distance of a respective code element to the start code element is an integer multiple of the standard. Proceeding from the start position value of the start code element, similarly to the procedure for the second code element, a calculated position value for all further code elements can be calculated and a calibrated position value can be stored on the basis thereof. For a third code element, which is detected in relation to the leading detection reference point, after displacement of the read head in the same step in which the second code element is detected in relation to the trailing detection reference point, the preparation of a calibrated position value is performed with the aid of double the standard. For the code elements adjoining calibrated position values, a triple, quadruple, etc. of the standard is used accordingly. The correction values thus prepared form a first calibration comb. If the calibrated position values are ideally calculated by addition of integer multiples of the standard, the length L of the first calibration comb results as the sum of a number P of standards s, wherein the number P corresponds to the number of the detected second code elements:

$$L = \sum_{1}^{P} s.$$

In the case of the formation of a calibration comb, it can occur or be advantageous that not all code elements are detected in relation to a detection reference point. Such code elements can occur at the end of the mass embodiment or if a calibration comb formation is only desired for a section of the code marking, for example. In particular to determine position values calibrated for these code elements, a calibration function can be generated on the foundation of the calculated position values at least in sections, which mathematically describes the calculated position values. Calibrated position values for individual code elements which have not yet been detected and calibrated up to this point are then determined on the basis of the calibration function. Of course, the mathematical calibration function for checking or re-determining calibrated position values can also be applied to already detected and calibrated code elements. On the basis of such a calibration function, calibrated position values can also be determined and stored by interpolation and/or extrapolation.

In a further embodiment, items of information, on the basis of which target position values for detected code elements are determinable, are stored in the control and analysis unit before a calibration according to the invention. A target position value is, in the meaning of the invention, a position value which is already stored in the storage unit before carrying out the calibration method and specifies an ideal position of a code element, which can deviate from its real position. For example, the ideal positions and/or the ideal distances of the code elements to one another can be known of a position code marking and can be stored in form of a code table in the storage unit before delivery of the device. If, for example, the ideal target position values are stored in the code table for the individual code elements, these can then be assigned to real code elements of the position code marking which are detected during the calibration. Because of the further above-described environmental or aging influences, it can be that such a target position value does not correspond to the actually provided position of the code element, because of which correction values for the target position values of the detected code elements are determined on the basis of the calculated position values for the detected code elements in the scope of the calibration method. A correction value is understood as a value determined on the basis of the calibration method according to the invention, which specifies the actual position of a code element in relation to the target position value assigned thereto. In other words, a correction value is thus an error specification for a target position value. For this purpose, a calculated position value calculated as described above is compared to the target position value of the corresponding code element and a deviation thus determined is stored as a correction value in the storage unit. The combination of correction value and associated target position value is subsequently available as a calibrated position value for a distance measurement for the high-precision position determination. Such a correction value can also be used as a correction value for adjacent code elements which are not detected in the scope of a comb formation. Alternatively, in the present embodiment, i.e., if target position values are provided—as described above—the calculated position value itself or a position value derived from calculated position values can also be stored as a calibrated position value in the storage unit, without determination of a deviation and therefore a correction value. A calibrated position value then replaces the target position value already present in the memory.

In an alternative embodiment, the read head has a write unit, which is leading in relation to the sensor unit and using which code elements, which form a position code marking, can be written on the mass embodiment. The code elements prepared by means of the write unit located in the read head are calibrated on the basis of the standard of the sensor unit using the above-described method. In a further alternative embodiment, the linear encoder has, instead of a write unit in the read head for writing code elements, a separate write head, which can be mounted additionally or alternatively to the read head for the writing operation.

In order that the mass embodiment is writable by the write means or the write head and the code elements are detectable by the read head, these three components are embodied adapted to one another. For example, in the case of optoelectronic sensors, the mass embodiment is made of a light-sensitive material, which is exposed by the write means, whereby code elements are formed at the exposed positions, which are detectable by the optoelectronic sensors. Alternatively, the mass embodiment is made of a material such as metal or glass, which is processed by the write means at targeted positions, for example, by scoring or lasers, so that by changing the properties of the material or by material removal, code elements arise which are optoelectronically detectable. As further alternatives, code elements are written, for example, by magnetization or material application (for example, paint or plastic application having electrically conductive or magnetic particles). Code elements are therefore written, which, in a manner adapted to the sensors of the read head, are detectable thereby, for example, capacitively or using the Hall effect.

For the high-precision determination of the detection distance and therefore the standard, in one embodiment, the linear encoder has a precision measuring unit, using which the detection distance is measurable at any time, in particular optoelectronically. Such a precision measuring unit can be implemented, for example, as a laser interferometer, which is a component of the read head in particular. As a component of the laser interferometer, an optical unit is located in a known position in relation to a detection reference point in each case, in particular in relation to the linear axis, offset in parallel thereto precisely at the detection reference point. The optical distance between the two optical units is measured with high precision by interferometry in the scope of the calibration method and the length determined therefrom is stored as the standard in the storage unit. Further embodiments of a linear encoder having an integrated standard are found in FIGS. 2 to 5 and the associated descriptions of European patent application EP 14155582 "System for determining relative positions" of the same applicant, filed on 18 Feb. 2014, and are hereby an integrative component of the present application.

In another embodiment of the linear encoder, the substrate, by means of which the detection reference points of the sensor unit are fixed, is manufactured from a material which is dimensionally-durable and aging-resistant and has a coefficient of thermal expansion having an absolute value in the range of 0 to at most $5 \cdot 10^{-6} K^{-1}$. The standard is then determined with high precision in that the detection distance is measured with high precision at the producer before the installation of the sensor unit, preferably with a relative error of at most $5 \cdot 10^{-6}$, in particular with a relative error of at most $1 \cdot 10^{-6}$, especially with a relative error of at most $5 \cdot 10^{-7}$. The substrate preferably has a coefficient of expansion, the absolute value of which is not greater than $1 \cdot 10^{-6} K^{-1}$, especially not greater than $6 \cdot 10^{-7} K^{-1}$. The specified values for the absolute value of the coefficient of thermal expansion are not exceeded in particular at least for a temperature of the substrate in the range of 273K to 343K, especially at least for a temperature in the substrate in the range of 283K to 303K. Examples of such a material are quartz glass, especially glass ceramics such as Zerodur or special metal alloys such as Invar. Implementations of such a sensor unit are also found in European patent application EP 14155582 "System for determining relative positions" of the same applicant, filed on 18 Feb. 2014, in the descriptions of the embodiments according to FIGS. 5 to 8 and in FIGS. 5 to 8, and are hereby an integrative component of the present application.

The read head according to the invention thus has at least one standard, which is established by the detection distance of at least two detection reference points, which are spaced apart from one another by a substrate of the sensor unit. The standard is known with high precision because the substrate is length-stable and the detection distance is determined with high precision by a single precision measurement, in particular by external means, before installation of the linear encoder and was stored in the memory. Or the standard is known with high precision in that the detection distance is determinable by a current precision measurement, which can be carried out again and again, by means of an internal precision measuring unit of the read head. Both possibilities are combinable. A high-precision, defined reference length is thus provided as a standard independently of environmental influences, on the basis of which a calibration of the mass embodiment can be carried out at any time by the linear encoder itself, without having to make use of an external calibration device.

An advantageous linear encoder is thus provided by the present invention, which enables a high-precision distance measurement or position measurement with substantially lesser demands on the mass embodiment than in the case of linear encoders according to the prior art with regard to precision and dimensional stability, in particular with reference to aging resistance and thermally related expansion behavior. In particular, one advantage of the linear encoder according to the invention is that a high-precision distance or position measurement is possible independently of temperature influences on the mass embodiment. This advantage is achieved without having to perform temperature determinations for this purpose. It is also not necessary to manufacture the mass embodiment specially with regard to its mechanical or material structure.

Achieving a high precision is no longer bound, as in linear encoders according to the prior art, to properties of the mass embodiment. A displacement of the precision from the mass embodiment into the read head takes place. Therefore, only minor demands are placed on the mass embodiment, both with regard to the manufacturing material and application of the position code and also with regard to installation and maintenance. In particular, the mass embodiment can be composed of multiple individual parts without having to place special demands in this case on the installation, above all with regard to the embodiment and quality of the connections of the individual parts. Lower production costs of the mass embodiment and lower maintenance costs of the linear encoder than with linear encoders according to the prior art are thus enabled. The present invention additionally enables omitting a special workpiece as the mass embodiment, which would be attached to the movable element, for example. Instead, the element of the linear encoder movable in relation to the read head itself is usable as the mass embodiment, in that the position code marking is written thereon at the producer or by the write means of the linear encoder. Thus, for example, the measuring table of a CMM or the positioning element of a linear drive are suitable according to the invention as the carrier of the position code marking, whereby further cost advantages result.

Lower maintenance costs also result in the present invention in that a user can replace the read head himself. Maintenance of the linear encoder or a measuring system which contains the linear encoder is also simplified in that it is now possible to only send in the read head to the producer, instead of the entire measuring system as heretofore.

A further advantage of the present invention is the provision of an improved linear encoder, the mass embodiment of which can be calibrated with high precision in a simple manner without external position determination means, and a correspondingly improved calibration method. Therefore, calibration operations of the mass embodiment after installation of the linear encoder in a device, for example, a coordinate measuring machine, are also enabled in a simple manner and before each measurement application. In contrast to methods according to the prior art, a calibration is also possible without knowledge of target position values of the code elements. In particular, the calibration method can be carried out automatically, which provides additional time and cost advantages. A calibration can be initiated independently by the control and analysis unit of the linear encoder, either after the occurrence of special events such as shocks or error messages and/or routinely at specific time intervals. The combination with a temperature detection or the detection of other environmental influences is also conceivable, of course, wherein automatic calibration is performed, for example, if a critical value with respect to the expansion behavior of the mass embodiment is exceeded.

With regard to a position determination during a distance measurement, the linear encoder according to the invention offers the additional advantage that due to the presence of at least two detection reference points, a position determination can be performed robustly and/or with little error, for example, by averaging from two position values.

To further increase the robustness and/or precision of a distance measurement and in particular the calibration and/or for carrying out the calibration more rapidly, in one embodiment of the linear encoder, the sensor unit can have at least three detection reference points, whereby at least two standards are defined. The detection distances and therefore the standards are of different sizes. In particular, the distances are selected so that at least one standard is an integer multiple of one of the other standards. In the scope of the calibration method, a correction value is determined at least for some code elements on the basis of at least two different standards, in particular on the basis of those which are not integer multiples of one another.

In the method disclosed in EP 1195880 A1, the distance of the two sensors to one another is dependent on the distance of the code elements. In contrast thereto, in the present invention, the relative position of the detection reference points to one another and therefore the standard can, in all embodiments, be designed to be essentially independent of the distance of two code elements on the mass embodiment. The standard can thus be established, for example, so that not only the two code elements to be detected in one step, but rather multiple code elements of the mass embodiment are located within the standard. The standard can therefore be selected to be as large as possible. This offers the advantage that only the size of the read head specifies the limit for the relative error of the standard. This is advantageous in particular the more finely the entire linear encoder or the mass embodiment and therefore the distance of the code elements to one another is conceived. In addition, if a relatively large standard is used, fewer successive displacement steps for a calibration of the entire position code marking are required in relation to a small standard. A calibration comb thus formed consists of fewer values, whereby the number of errors which are added up is reduced.

By way of a relatively large standard in comparison to the code element distances or to the read head, which extends over multiple code elements, not all code elements are detected during the preparation of a first calibration comb, but rather undetected, uncalibrated code elements remain between two code elements detected in relation to the first and second detection reference points.

To determine calibrated position values for such undetected, uncalibrated code elements, in a refinement of the calibration method, further calibration combs can be formed. For this purpose, a code element which is located adjacent to the first start code element on the mass embodiment can be used as a further start code element and the calibration steps of the first calibration comb can be repeated proceeding therefrom. In the meaning of the invention, "adjacent" means that the two code elements are located close to one another and not that the two code elements must be located directly next to one another. Those code elements which are adjacent within one standard can be used as start code elements for forming multiple calibration combs. In particular, these can be all code elements within one standard on the mass embodiment, but also only a specific selection thereof, for example, every third code element. Proceeding from the adjacent start code elements, calibration combs independent of one another are prepared for code elements linked to one another, wherein code elements associated with various calibration combs are adjacent to one another similarly to the start code elements.

In a refinement of the calibration method, distances of code elements to one another on the mass embodiment are determined. For this purpose, the sensor unit can have, in one embodiment of the linear encoder, at least two detection regions each having a detection reference point. Each detection region is capable of detecting at least two code elements in one step. Each code element can be detected in relation to the detection reference point of the respective detection region. A position of the code element on the mass embodiment in relation to the detection reference point and the distance between this code element and a further code element located in the detection region of this detection reference point are determinable therefrom. For example, for this purpose, the position of a code element scanning signal on a line sensor or surface sensor of the sensor unit can be determined. A distance of code elements to one another can either be determined on the basis of the distances thereof to the detection reference point or directly from the distance of the detector positions of the respective scanning signal.

Alternatively, distances on the mass embodiment of code elements from one another can be determined, by firstly determining the distance of each observed code element to a shared reference code element. Such a reference code element can be, for example, a start code element or another arbitrary code element. The code element distance to be determined between two code elements is then ascertained by calculating the difference of the distance of the one code element to the reference code element and the distance of the other code element to the reference code element.

On the basis of the determined code element distances, the calibration combs, which are initially not linked to one another, can be related to one another, in particular by an equalization calculation. For example, proceeding from the start position value of a first start code element, calculated position values for the further start code elements can be calculated on the basis of the start code element distances. Such a calculated start code element position value is then used to prepare the calculated position values for the further code elements of the respective calibration comb.

Alternatively, proceeding from a calculated position value of a code element of a calibration comb, calculated position values can be calculated for the adjacent code elements, which are associated with the further calibration combs, on the basis of the code element distances. The calculated position values of the adjacent code elements are then used as the foundation for calculating the calculated position values of the further code elements of a respective calibration comb. Alternatively to using measured code element distances, linking of calibration combs can be performed on the basis of information stored in the control and analysis unit. Such information can be, for example, target position values of code elements. Finally, all calculated position values can thus be prepared proceeding from the start position value of the first start code element.

In a further refinement of the calibration method, calibrated position values can be prepared for the start code elements themselves. The region at the zero position or starting position of the linear encoder can thus advantageously also be calibrated, which is significant above all in the case of a relatively large detection distance. For this purpose, a sum of the start code element distances is calculated, wherein the start code elements are located as described within one standard. This sum is compared to the standard and, for example, a deviation is determined, for example, by calculating a difference of standard and sum of the start code element distances. On the basis of this deviation, calibrated position values are generated for the start code elements. In particular, a mean start code element correction value, which is equal for all start code elements, can be determined on the basis of the number of the start code elements and the deviation, for example, by dividing the deviation by the number of the start code elements. Or, individual calibrated position values are prepared from the deviation by weighting of the individual start code element distance. Which of the two options is used, optionally also in combination in sections, can be made dependent, for example, on how uniformly the code elements are distributed on the mass embodiment. If the two start code elements located at the edge of the standard are located along the linear axis at a distance (offset) to the trailing or leading detection reference point, this distance can also be measured for the deviation determination. If only one start code element distance is determinable within a standard, because only two start code elements are present, this one start code element distance—without calculating a sum of start code element distances—is used for comparing and determining a deviation from the standard.

The comparison of one code element distance, in the case of two code elements within one standard, or a sum of code element distances, in the case of multiple code elements within one standard, to the standard and the determination of a deviation can also be performed similarly for further code elements.

In addition, such a deviation can be used as a measure of quality for the position value determination of the linear encoder, in particular with respect to establishing errors of the mass embodiment. For this purpose, such a deviation determination can also be performed independently of the remaining calibration method, for example, during a running measurement operation of the linear encoder. If the deviation exceeds a specific limiting value, an inadequate quality of the determined position values is assumed. Such a deviation can be caused, for example, by a change of the real distances of the code elements on the mass embodiment, for example, due to a temperature-related expansion/shrinkage or an age-related change of the mass embodiment. If the defined deviation limiting value is exceeded, a notice can be output to a user, for example, in the form of an acoustic or optical warning, and/or a calibration of the linear encoder can be initiated automatically. The standard can thus be used to check the precision of the position code marking during the measurement operation.

As described above, it can occur or be advantageous that not all code elements are detected in relation to a detection reference point. In a refinement of the calibration method, the measured code element distances are used to determine calibrated position values for such code elements, for example, as an alternative to the use of a calibration function. For this purpose, the code element distance from the "uncalibrated" code element to an adjacent code element is determined, for which a calibrated position value is present. On the basis of this calibrated position value, in consideration of the code element distance, a calculated position value for the heretofore "uncalibrated" code element is determined and stored as the calibrated position value for this code element. For example, the calculated position value which is sought for the heretofore "uncalibrated" code element can be determined by addition of the code element distance to the calculated or calibrated position value of the adjacent "calibrated" code element. Alternatively, by way of interpolation methods known to a person skilled in the art, a calculated position value for "uncalibrated" code elements can be determined, specifically on the basis of one or more calibrated or calculated position values of an already prepared calibration comb in consideration of the respective determined code element distance from an "uncalibrated" to the adjacent "calibrated" code element.

In a further refinement of the calibration method, errors of calculated position values which periodically occur along the position code marking are at least partially ascertained in that the position code marking is closed to form an imaginary circle. For this purpose, optionally by virtually appending a starting part of the position code, a period is terminated to be able to close the position code marking continuously. Periodic errors can be determined as harmonics by the circle closure and these can be stored as an additional correction value table in the storage unit.

In a further refinement of the calibration method, the read head also has, in addition to its sensor unit having at least two detection reference points, a write unit, which is fixed in the extension direction by means of a substrate at a defined distance to the sensor unit or one of its detection reference points. The distance between the write unit and the sensor unit or said detection reference point (referred to hereafter as the write-read distance) is again either thus known with such high precision and therefore usable as a standard that it is measured and stored with high precision by a precision measuring unit present in the read head each time before and, under certain circumstances, also during the usage, or in that the substrate consists of the described aging-resistant and temperature-resistant material (thermal coefficient of expansion having an absolute value in the range of 0 to at most $5 \cdot 10^{-6} K^{-1}$) and the distance is determined with high precision once before the use of the device, preferably at the producer, and is stored in the storage and analysis unit. "High-precision" determination or measurement again means a measurement or determination of the write-read distance having an error of at most $5 \cdot 10^{-6}$.

The write-read distance is therefore determined or determinable with high precision similarly to the detection distance and can thus be used as a standard. The mass embodiment is at least substantially empty at the beginning of the calibration method, i.e., it has no code elements or only a few, in particular one start code element. The writing of the mass embodiment is then performed in that the read head is successively displaced proceeding from a start code element and, in a respective relative positioning of read head and mass embodiment, an existing code element (at the beginning the start code element) is detected by the sensor unit and, in this relative positioning, a code element is written on or in the mass embodiment by the write unit. The calibration of the code elements is performed simultaneously with the writing in this case, since the distance between write unit and detection reference point of the sensor is determined with high precision having an error of at most $5 \cdot 10^{-6}$ and is stored as a standard. Due to the write-read distance established or determined with high precision, proceeding from the position of at least one start code element, the positions of the code elements written by the write unit are therefore known and thus calibrated with high precision.

Alternatively, the calibration is performed in a linear encoder having a substrate made of the described aging-resistant and temperature-resistant material not by means of the high-precision determination of the write-read distance but rather simply based on the knowledge that the write-read distance is constant with the aid of the selected substrate (with a deviation in the absolute value of at most $5 \cdot 10^{-6}$). Instead of determining or knowing the write-read distance precisely in its length, a mass embodiment is used which already has an array of calibrated start code elements, i.e., which are precisely known in their distance in relation to one another, and which result in a position code on a small region of the mass embodiment and which form the foundation of the calibrated writing of further code elements on the remaining region of the mass embodiment.

For verification of the calibration completed during the writing of code elements, if it is considered necessary, a calibration can be carried out by means of the at least two detection reference points of the sensor unit, as described above.

The present invention also includes a computer program product or computer data signal, embodied by an electromagnetic wave, having program code, for controlling or carrying out the calibration method.

The individual steps of the calibration method can be executed in any suitable sequence. In particular, the calculations required for the calibration can be assembled into a matrix and carried out en bloc. The control and execution of the method can be performed by the linear encoder itself or, with the aid of suitable data transmission devices, entirely or partially externally, for example, by a connected computer unit.

The linear encoder according to the invention and the calibration method according to the invention will be described in greater detail hereafter solely as examples on the basis of exemplary embodiments which are schematically illustrated in the drawing.

BRIEF DESCRIPTION OF THE DRAWINGS

In the specific figures

DETAILED DESCRIPTION

Figure 1A:
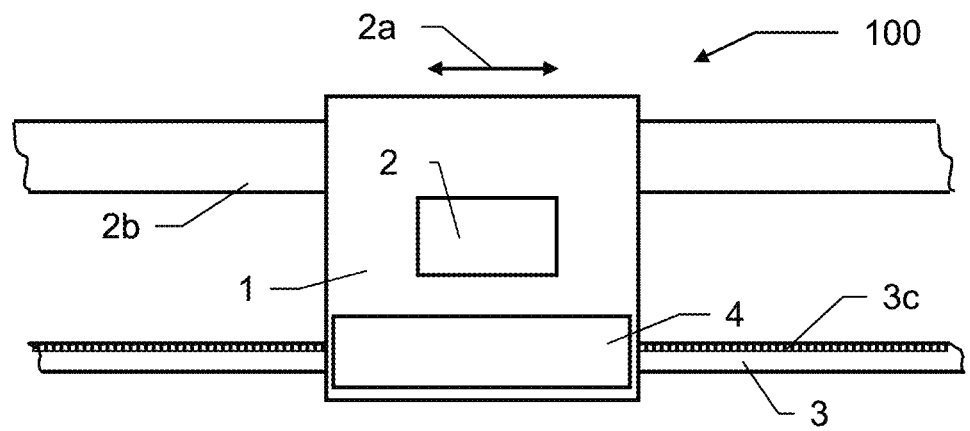
FIG. 1a shows a schematic overview illustration of a linear encoder according to the prior art.

FIG. 1a shows a general schematic diagram of a linear encoder 100 according to the prior art having a read head 1, which can be moved on a rail 2b in relation to a stationary mass embodiment 3 in the linear direction along the extension direction of the mass embodiment 3 (indicated by double arrow 2a), whereby a measurement of a linear distance can be performed. To generate a relative movement along an axis, the read head 1 can also be fixedly installed and the mass embodiment 3 can be moved in relation thereto, for example, by fastening the mass embodiment on a moving object to be measured. The mass embodiment 3 has a position code marking 3c, which is partially detected by a sensor unit 4 of the read head 1. By analyzing the signals of the sensor unit 4 generated by the detection, a control and analysis unit 2 of the linear encoder 100 can determine the position of the read head 1 in relation to the mass embodiment 3 on the basis of information stored in a storage unit of the control and analysis unit 2. The control and analysis unit 2 is capable of controlling measuring operations.

The mass embodiment 3 is illustrated here as a ruler having an incremental position code marking 3c made of individual identical code elements, schematically shown as markings applied at regular intervals made of alternating light and dark sections. To determine a read head position, a start position and the position distance between two increments are stored in the control and analysis 2. The code can also be embodied as an absolute code, by implementing the code elements, for example, as a sequence of different code patterns, which can each be uniquely assigned to a position value by the control and analysis unit 2 on the basis of the stored information, at least for subsections of the mass embodiment 3. Examples of position codes according to the prior art are found in EP 12175130.9, DE 19604502 A1, WO 01/61280 A1, US 2004189984 A1, DE 102008055680 A1, and U.S. Pat. No. 7,608,813 B1.

The above-mentioned documents predominantly relate to optical electronic detection methods. With regard to the invention, alternative implementations of position code marking 3c and sensor units 4 can also be applied. All physical action principles are suitable, which are capable of determining a position value, for example, inductive, capacitive, or magnetic measurement principles, in which electrical or magnetic code elements are detected by an appropriately implemented sensor unit 4.

Figure 1B:
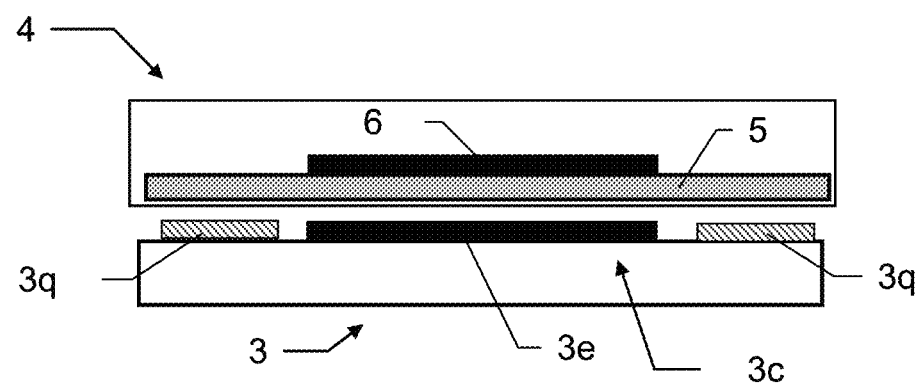
FIG. 1b shows a schematic illustration of a sensor unit and a mass embodiment of a linear encoder according to the prior art.

FIG. 1b shows a portion of a linear encoder according to the invention having capacitive measurement principle, which comprises a sensor unit 4 and a mass embodiment 3, shown in a section perpendicular to the linear movement direction of the read head or the linear extension direction of the mass embodiment 3. The mass embodiment 3 comprises a position code marking 3c made of capacitive code elements 3e having supply lines 3q. The sensor unit 4 has, on a substrate 5, a sensor 6, which is used for the capacitive detection of the capacitive code elements 3e of the position code marking 3c.

Figure 2A:
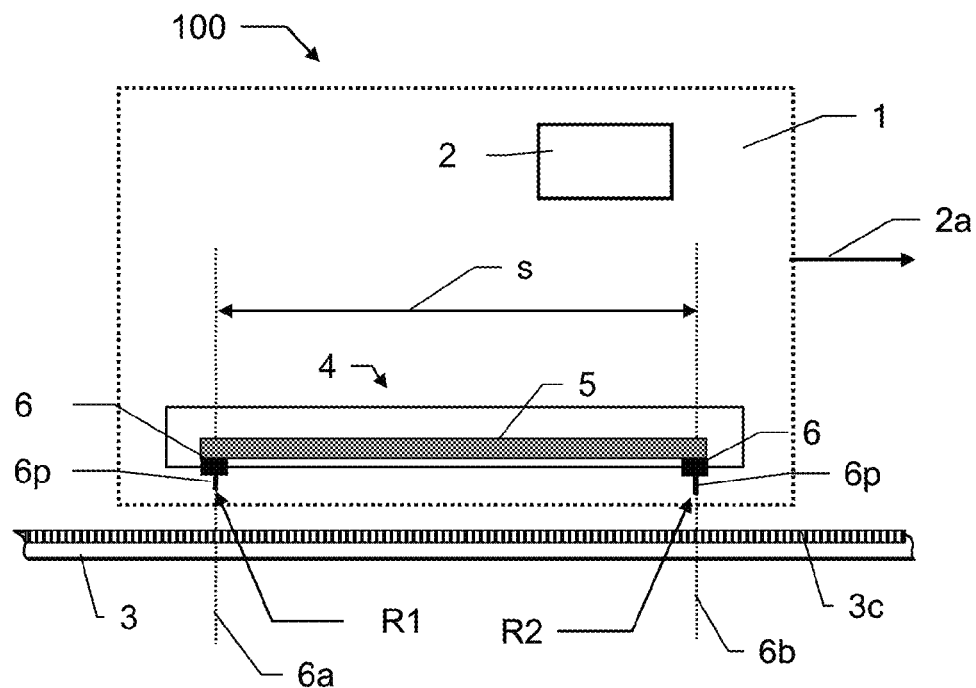
FIGS. 2a-d show examples of read head and mass embodiment of a linear encoder according to the invention.

FIG. 2a shows an example of a linear encoder 100 according to the invention. Its read head 1 contains a sensor unit 4, which has two sensors 6, each having one detection reference point R1 or R2, respectively. With respect to the movement direction 2a of the read head 1 in relation to the mass embodiment 3, the trailing detection reference point is identified with R1, and the leading detection reference point is identified with R2. Such a detection reference point R1 or R2 is distinguished in that by detecting a code element of the position code marking 3c in relation to a detection reference point by means of a sensor 6, a unique relative location between read head 1 and code element can be ascertained at least in the direction of the linear movement direction. In particular, a detection reference point can be the origin of an internal coordinate system of a respective sensor 6. In the case of a detection field, which is nearly punctiform at least in the direction of the distance axis, of a sensor 6, the detection reference point R1 or R2 is the detection field itself, for example, the sensor tip 6p of a respective sensor 6. A code element of the position code marking 3c is detected in FIG. 2a when—in the scope of the detection precision—it is located perpendicularly "below" a sensor tip 6p (indicated in the figure by the lines 6a and 6b).

The sensors 6 are fixedly positioned on a substrate 5. The substrate 5 is manufactured from a dimensionally-durable and aging-resistant material, which has a linear coefficient of thermal expansion having an absolute value in the range of 0 to at most $5 \cdot 10^{-6} K^{-1}$. Such low thermal expansion materials or ultra low thermal expansion materials (LTE bzw. ULE) having the required properties are, for example, glass ceramics such as Zerodur or other special ceramics, polymer-ceramic composites such as lithium aluminosilicates (LAS), quartz glasses, borosilicate glasses such as Pyrex, or special iron-nickel alloys (Invar). According to the invention, in particular a maximum value of the coefficient of expansion of $5 \cdot 10^{-6} K^{-1}$ is not exceeded at least within a temperature range of 10° C. to 30° C., which is sufficient for many intended uses of the linear encoder 100. For other intended uses and for better storage stability, a substrate is used, the coefficient of expansion of which also does not exceed the value of $5 \cdot 10^{-6} K^{-1}$ within a temperature range of −20° C. to 70° C. In special embodiments of the linear encoder 100 according to the invention, the substrate material has a linear coefficient of thermal expansion in each case for the mentioned temperature ranges having an absolute value of 0 to at most $1\cdot10^{-6}K^{-1}$, in particular up to at most $6\cdot10^{-7}K^{-1}$. Due to the arrangement of the sensors 6 on such a substrate, the distance between the sensors and therefore between the detection reference points R1 and R2 is fixed in a thermally-stable and aging-resistant manner.

A detection distance is established by the distance of the two detection reference points R1 and R2 to one another. The detection distance, as shown in FIG. 2*a*, is preferably greater than the distance of code elements to one another, so that multiple code elements are always located between two detection reference points R1 and R2 on the mass embodiment 3 in this embodiment. The respective coordinate systems of the sensors 6 can be linked to one another by determination of the detection distance. According to the invention, a standard s for calibrating the position code 3*c* is defined by the detection distance, wherein the calibration is executed with the aid of a calibration functionality of the control and analysis unit 2 of the read head 1. This detection distance is determined with high precision and stored at the producer in this example, for example, so that the standard is defined with a relative error of $2\cdot10^{-6}$. Due to the arrangement of the sensors 6 on a substrate 5 having the described properties, the standard s consistently maintains the value determined by the measurement at the producer in the scope of very small error limits. In particular, the standard s, due to the high-precision measurement at the producer in combination with the stability properties of the substrate, is determined independently of environmental influences with a relative error of at most $5\cdot10^{-6}$, for example, with a relative error of $1\cdot10^{-6}$.

Figure 2B:
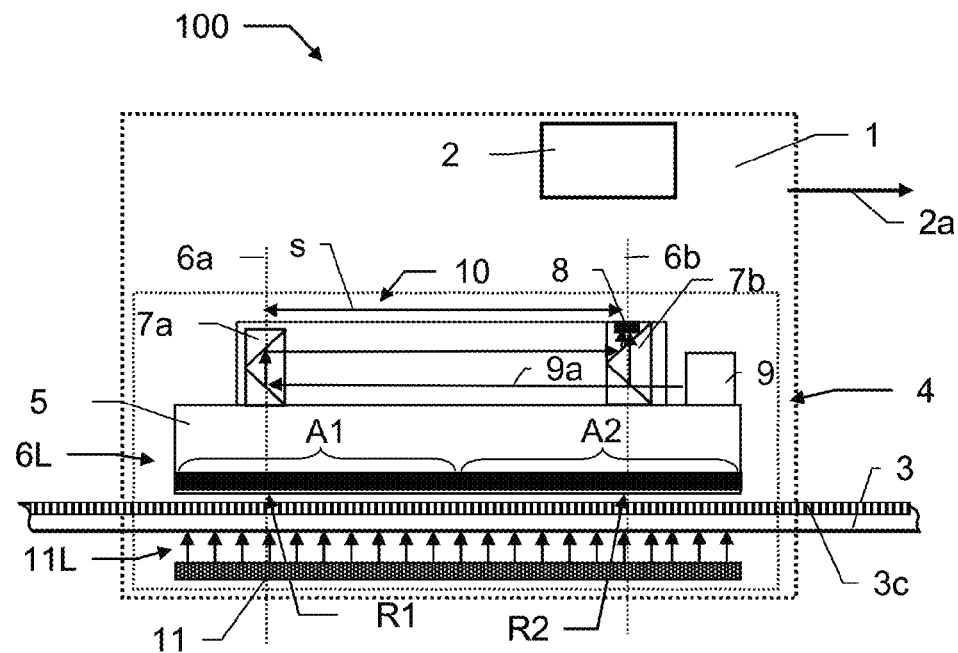

FIG. 2*b* shows a linear encoder 100 according to the invention, in which the sensor unit 4 has a line sensor 6L on a substrate 5. The line sensor 6L has two detection regions A1 and A2 having detection reference points R1 and R2 spaced apart from one another. For example, the sensor unit 4 and accordingly a position code marking 3*c* can be embodied for determining position values by means of optoelectronic principle. The read head laterally encompasses the mass embodiment, for example, in a U-shaped embodiment. The sensor is arranged on the read head oriented toward one side of the mass embodiment. An illumination means is arranged on the read head oriented toward the opposite side of the mass embodiment. For this purpose, the sensor unit 4 has, for example, an illumination unit 11 having a plurality of individual spot light sources or a collimated light curtain, which irradiates the position code marking 3*c* with oriented light 11L. In the example, the detection of the code elements is based on the transmitted light method. Illumination light passing through the mass embodiment 3 having the position code marking 3*c* is at least partially detected by one of the light-receptive optoelectronic detection regions A1 or A2. This can be implemented, for example, as a CCD array divided into two detection regions A1 and A2 for position-sensitive detection of projections or images of the code elements. In a respective detection region, a zero point of the detection region, which is established, for example, by the center of the CCD array, is used as the detection reference point R1 or R2, whereby its precise location in relation to the center and, via this, to the other detection reference point is known. A code element is detected in relation to a detection reference point, for example, R1, by determining the distance of the image on such a position-sensitive CCD photodetector region to its zero point, from which, on the basis of known imaging ratios, the distance of the code element itself to the projection of the detection reference point R1 on the mass embodiment in the direction of the linear extension of the mass embodiment 3 can be concluded.

The sensor unit 4 can, in one step, detect at least one code element of the position code marking 3*c* in relation to a detection reference point R1 and a further code element in relation to a detection reference point R2. The detection distance between the two detection reference points is previously known as stated and defines a standard s, whereby the position code marking of the position code marking 3*c* can be calibrated using the calibration functionality of the control and analysis unit 2.

In an alternative embodiment of the linear encoder 100 according to the invention—in contrast to the linear encoder 100 according to FIG. 2*a*—the substrate 5 is manufactured from a less dimensionally-stable material. In the linear encoder 100 according to the invention according to FIG. 2*b*, which illustrates this alternative embodiment, for a calibration, a high-precision definition of the standard s is achieved in that the read head 1 has a precision measuring unit 10, which is implemented in the example as a laser interferometer. The interferometer consists of a laser source 9 for emitting a laser beam 9*a*. The laser beam 9*a* is guided by a beam splitter of a second optical unit 7*b*, which is located in a known and fixed position in relation to the detection reference point R2, partially onto a first optical unit 7*a* and partially onto a photodetector 8 sensitive to the laser radiation. The first optical unit 7*a* is implemented as a deflection mirror and is located in a known and fixed position in relation to the detection reference point R1. It is used for reflecting the laser light arriving thereon, which is then redirected in the second optical unit 7*b* to the photodetector 8. In particular, the first and the second optical units 7*a* and 7*b*, respectively, are positioned so that they are located on the read head side perpendicularly to the mass embodiment on a projection axis 6*a* or 6*b* of a respective detection reference point R1 or R2. The part of the laser radiation is guided onto the photodetector 8 by the optical unit 7*a* and a deflection mirror of the optical unit 7*b*, where it interferes with the laser radiation directly received from the beam splitter of the optical unit 7*b*. A relative distance of the laser source 9 and the optical unit 7*a* can be concluded from the interference appearance in a known manner and therefore, according to the invention, the above-described previously known distance of the detection reference points R1 and R2 and the standard s can be determined with high precision at any time. In particular, a change of the standard s, which is caused thermally or by other environmental influences or aging influences, is thus determinable according to the invention.

Figure 2C:
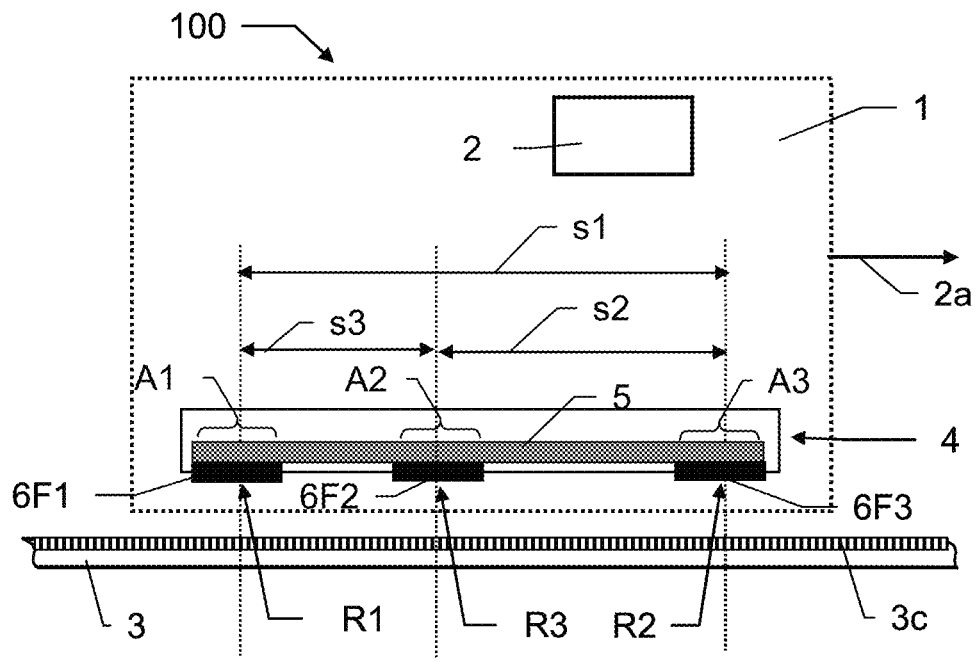

FIG. 2*c* shows a linear encoder 100 according to the invention, which has a sensor unit 4 having multiple, three here, detection reference points R1, R2, and R3. These are each, for example, the zero points of three surface sensors 6F1, 6F2, 6F3 each having a detection region A1, A2, A3, which each have an extension which permits the simultaneous detection of multiple code elements of the position code 3*c*. The sensors 6F1, 6F2, 6F3 are fixed on a substrate 5, which is manufactured from a dimensionally-durable and aging-resistant (ultra) low thermal expansion material, whereby the high-precision known detection distances between the detection reference points R1, R1, and R3 remain constant. These detection distances define, according to the invention, three standards s1, s2, and s3 of different lengths, wherein a standard is defined in each case with a relative error of at most $5 \cdot 10^{-6}$ and is stored in the control and analysis unit 2. The detection distances are selected in particular so that at least one standard s1, s2, s3 is not an integer multiple of another standard s2, s3, s1. These can be interfering moiré patterns in particular in the case of optical linear encoders, which help to prevent periodic structures from being able to arise upon superposition. Due to a provision of multiple standards s1, s2, s3, more precise and/or robust calibration of the position code 3c of the mass embodiment 3 by means of the read head 1 is possible. The provision of multiple sensors 6F can be used during a subsequent distance measurement to make a position of a movable element even more precise and/or robust, for example, by determining a shared average position from the individual position values.

Figure 2D:
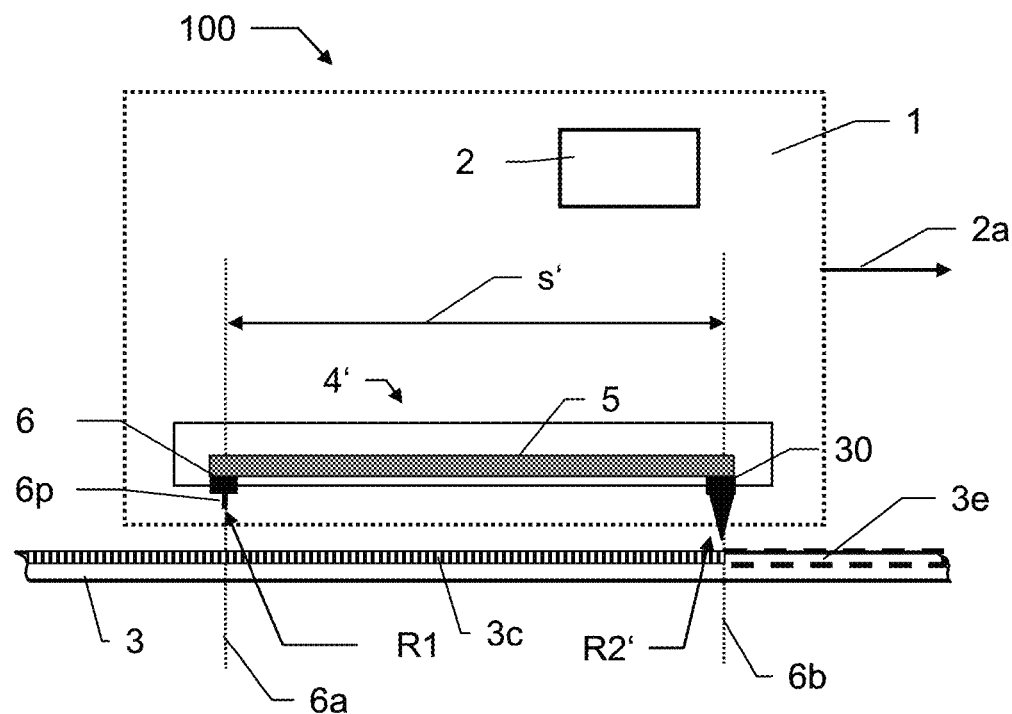

FIG. 2d shows a read head 1, which is implemented similarly to that shown in FIG. 2a. The read head 1 has, instead of a sensor unit 4 having two detection reference points R1, R2 of two sensors 6, a read-write unit 4' having at least one detection reference point R1 of a sensor 6 and a write unit 30 having a write reference point R2', which are arranged so that the write reference point R2' is located leading the detection reference point R1 at a write-read distance s' in the movement direction 2a of the read head 1. The write-read distance s' is established with high precision by a substrate 5 made of a dimensionally-stable and aging-stable material of the above-described type. Alternatively or additionally, the write-read distance s' is determined in its length with high precision by a measurement at the producer or by a measurement using a precision measuring unit of the read head 1 (not shown in FIG. 2d), as it was explained, for example, on the basis of FIG. 2b.

FIGS. 3a to 3d illustrate the calibration method according to the invention with images of a first calibration comb K1 for a linear encoder 100 according to the invention. The sensor unit of the linear encoder is indicated by its, in this example two, detection reference points R1 and R2, by the fixed detection distance of which the standard s is in turn defined, which is known with high precision—as described above.

In the scope of the calibration method, in a first step (FIG. 3a), the read head 1 is positioned in relation to the position code marking 3c of a mass embodiment 3, which has code elements 20, so that a first code element 20 is detected as a start code element 20a in relation to the first, trailing detection reference point R1 (indicated by the line 6a). Any code element 20 can be used as the start code element 20a. In the same step, a second code element 20b (indicated by the line 6b) is detected in relation to the second, leading detection reference point R2.

In a second step (FIG. 3b), the read head is displaced along the position code marking 3c in the direction 2a until the second code element 20b is detectable in relation to the first trailing detection reference point R1. In other words, the read head is displaced by approximately one standard along the axis of the mass embodiment. In a further, third step, the second code element 20b is detected in relation to the first detection reference point R1 and, in addition, a further code element 20c is detected in relation to the second trailing detection reference point R2.

Figure 3A:
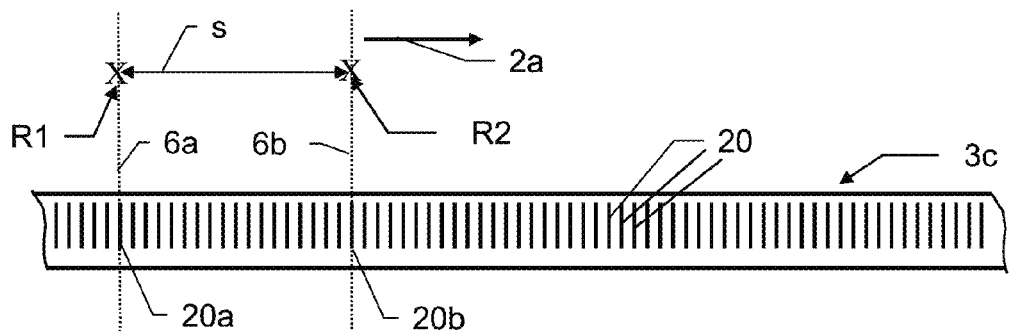
FIGS. 3a-d show schematic illustrations of the calibration method according to the invention.
Figure 3B:
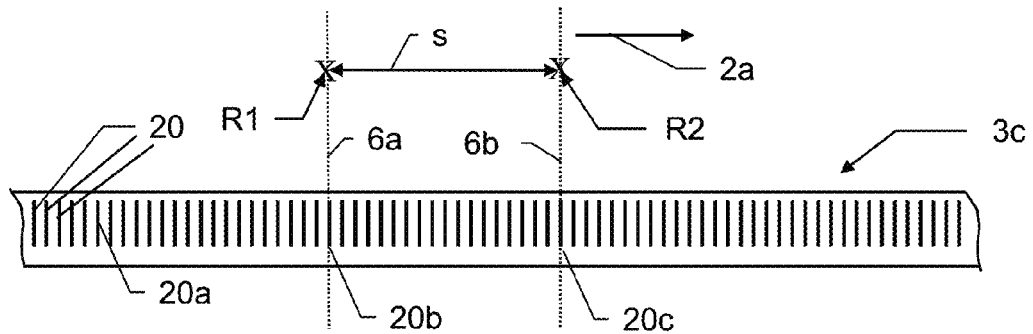
Figure 3C:
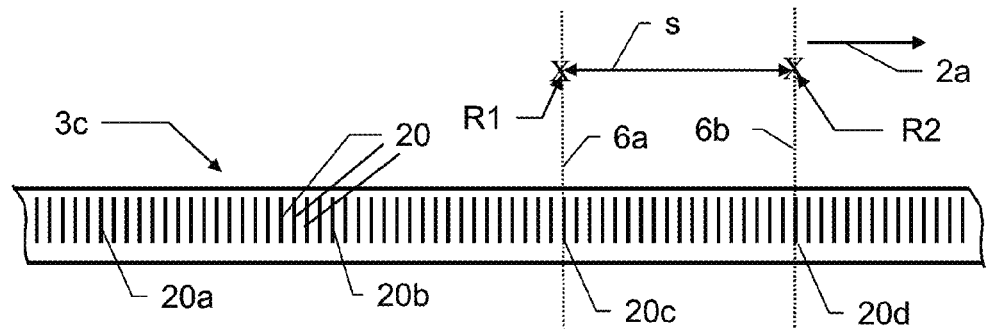
Figure 3D:
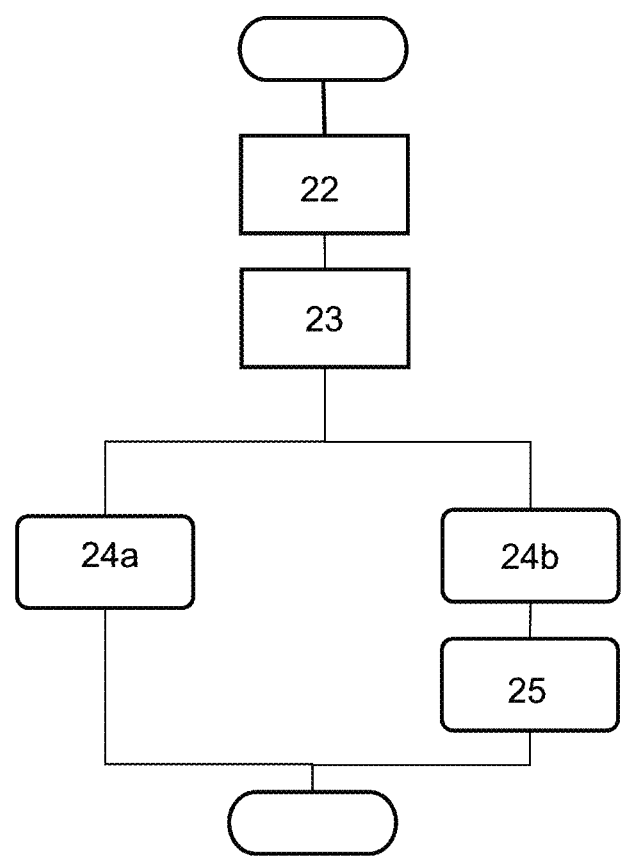

The second and third steps are repeated similarly, so that the further code element 20c is detected in relation to the first detection reference point R1 and a next code element 20d is detected in relation to the second detection reference point R2 (FIG. 3c). This is continued for further regions of the position code marking 3c, whereby data are detected for a first calibration comb K1. In particular, steps two and three can be repeated until the end of the position code marking 3c is reached.

Calibrated position values are determined for the detected code elements of the first calibration comb K1 in the scope of the calibration method. The determination according to the invention of calibrated position values in the scope of the calibration method will be described in greater detail on the basis of FIG. 3d.

In a step 22 (FIG. 3d), a start position value N20a for the start code element 20a is determined, for example, on the basis of a target position value stored in the control and analysis unit or by establishing the start position value as the zero point of the position code marking.

Proceeding from the start position value of the start code element 20a, calculated position values are calculated as follows for the further detected code elements in step 23: This is performed for the second code element 20b in that a standard s is added to the start position value of the start code element 20a, since the distance between the two code elements 20a and 20b on the position code marking 3c corresponds to one standard s. For the position value calculation of the further code element 20c, two standards s are added to the start position value of the start code element, since the distance between the two code elements 20a and 20c on the position code marking 3c corresponds to two standards s. Alternatively, one standard s can be added to the calculated position value of the code element 20b. A calculation of a calculated position value for the code element 20d is accordingly performed by means of adding three standards s to the start position value of the start code element 20a or by adding a further standard s to the calculated position value of the code element 20c. This procedure is continued accordingly for the further detected code elements. A displacement of the read head 1 can also be performed in the direction of position values which become smaller. Standards s are then added with negative sign.

Subsequently to step 23, according to the invention, in a step 24a, the calculated position values calculated according to step 23 can be stored as calibrated position values in the storage unit of the control and analysis unit. A determination of calibrated position values can also be performed on the foundation of the calculated position values such that a calibration function, which mathematically describes the calculated position values, is produced on the basis of the calculated position values. The individual calibrated position values are then prepared and stored on the basis of the calibration function. A calibration function can be produced for the entire detected region of the position code marking or also in sections, wherein a separate calibration function can be produced for each section. If target position values assigned to the code elements are already present in the control and analysis unit 2, they are replaced by the calibrated position values.

If the linear encoder 100 is subsequently used for measuring an object or a displacement, the calibrated position values, which are assigned to the code elements by the calibration method, are used for determining a position value.

If target position values assigned to the code elements are already present in the control and analysis unit, alternatively to step 24a, a correction value for the target position value of a code element can be determined in a step 24b by comparing the calculated position value calculated according to step 23 to the corresponding target position value and determining a deviation of the two from one another. In particular, a difference is calculated from the calculated position value and the target position value, the value of which forms the correction value.

In step 25, such a correction value is assigned to the corresponding code element and stored in the storage unit. The combination of target position value and correction value then forms the calibrated position value, which is used in the scope of a subsequent distance measurement for the position determination.

If the standard s is not known with high precision, for example, by way of a measurement at the producer, a high-precision determination of the standard s is performed in the course of the calibration method, in the example by means of optoelectronic measurement by the precision measuring device 10.

This is particularly advantageous in the case of a linear encoder 100 according to FIG. 2b, which has a substrate 5, which is less thermally-stable and aging-resistant.

The formation of multiple calibration combs K1 to K3 will be described on the basis of FIGS. 4a to 4c for a refinement of the calibration method according to the invention.

Figure 4A:
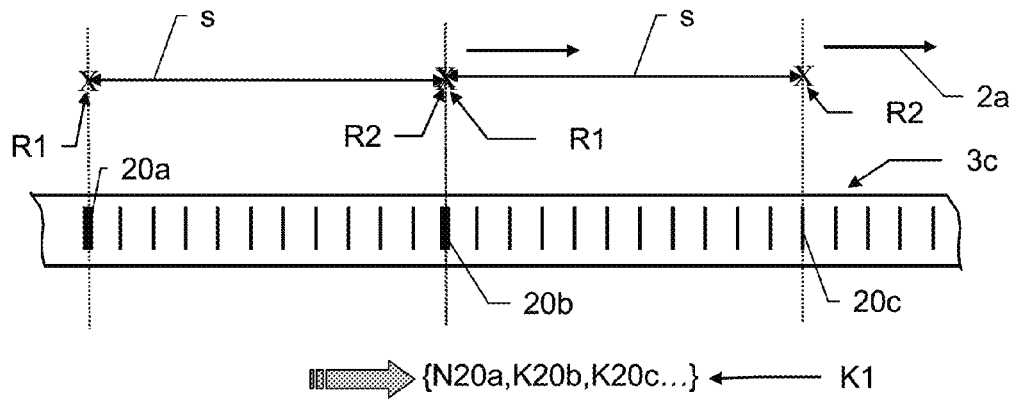
FIGS. 4a-c show schematic illustrations of refinements of the calibration method according to the invention.

FIG. 4a corresponds to a combination of the two FIGS. 3a and 3b. (The code elements 20a and 20b are only shown thicker than the remaining code elements for better recognition). The read head is positioned in a first step (shown on the left in FIG. 4a) so that a first start code element 20a is detectable in relation to the trailing detection reference point R1. This is detected in the next step in relation to the trailing detection reference point R1, and also a second code element 20b is detected in relation to the leading detection reference point R2. These steps are continued with the detection of further code elements (shown on the right in FIG. 4a), as described with respect to FIGS. 3a to 3c. In this manner, the foundation for a first calibration comb K1 is laid, via which finally the calibrated position values are assigned to the code elements 20a, 20b, 20c, etc.

Figure 4B:
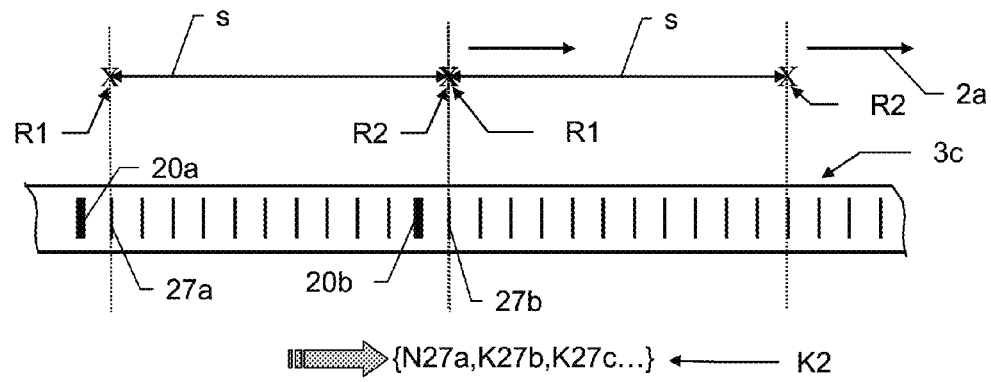

In FIG. 4b, the read head is positioned so that a code element adjacent to the first start code element 20a is detectable as the second start code element 27a in relation to the trailing detection reference point R1. The code element 27a is used as a start code element for preparing a second calibration comb K2, by repeating the method steps in the same manner as was described with respect to FIGS. 3a to 3d or with respect to FIG. 4a. In FIG. 4b, the code element 27a is thus detected in relation to the trailing detection reference point R1 and, in the same step, a further code element 27b is detected in relation to the leading detection reference point R2, etc.

Figure 4C:
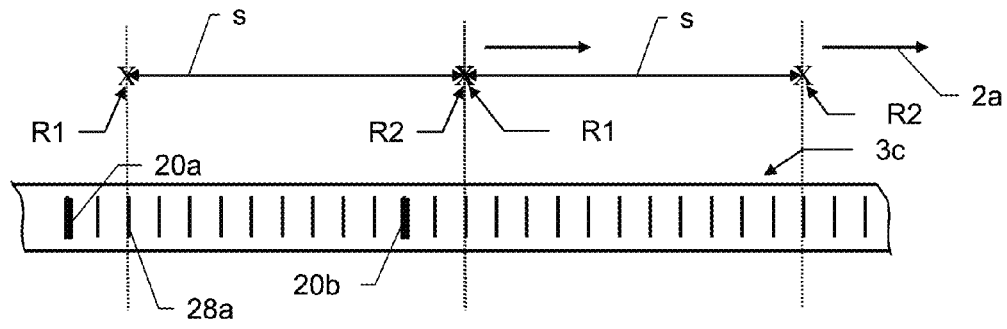

A further, third calibration comb K3 is prepared by using a further code element 28a as the start code element for carrying out the method steps according to FIGS. 3a to 3d (FIG. 4c).

Further calibration combs can be formed according to the invention in a similar way. To avoid multiple measurements of code elements, only those code elements which are located within one standard on the mass embodiment are used as start code elements. In the example according to FIG. 4a, these are the eleven code elements which lie between the code elements 20a and 20b, including the code element 20a and excluding the code element 20b. A number of calibration combs can be formed which corresponds to the number of all code elements within one standard. With respect to FIGS. 4a to 4c, for example, the number eleven thus results from the calibration combs K1 to K11. According to the invention, fewer calibration combs can also be prepared, and, for example, only every second code element or another selection from the code elements within one standard s can be used as the start code elements.

The various calibration combs can be prepared successively as described for FIGS. 4a to 4c. A preparation can alternatively also be performed in parallel, by displacing the read head to the next code element to be detected, independently of which calibration comb it is associated with. Thus, all start code elements and all further detectable second code elements are first detected successively, before the code elements are detected which are spaced apart by two standards s from the respective start code element, etc. In other words, a displacement of the read head 1 is first performed after "all" code elements in the region of the standard are detected as start code elements. An assignment of a detected code element to the associated correction comb is performed by the control and analysis unit 2.

For a linear encoder 100 according to FIG. 2c having more than two detection reference points, which establish multiple detection distances, multiple calibration combs can also be prepared in a similar manner, which are based, for example, on different standards s. Still more precisely calibrated position values can thus be determined, and the method can be made more robust and/or can be carried out with less time expenditure. By averaging of redundantly detected coding, non-systematic errors may be eliminated in the determination of position values.

For a linear encoder 100 having a sensor unit 4, which has at least two detection regions A1 and A2 each having one detection reference point R1 and R2 (see FIG. 2b or 2c), in a further refinement of the calibration method according to the invention, measuring of distances on a position code marking 3c of adjacent code elements 20 can be performed. A code element distance between two code elements 20 can be determined, for example, on the basis of the distance of the focal points of the state signals generated during the detection thereof by the sensor unit. If the detection of code elements is performed optoelectronically using a reflected light method, for example, the light reflected from two code elements thus generates two brightness peaks spaced apart from one another on a position-sensitive detector. The distance of these two brightness peaks can be used for calculating the code element distance of these two code elements.

Alternatively to the focal point determination, other methods are also known to a person skilled in the art, by means of which the precise position of code elements on the position code marking 3c and therefore a distance of these code elements can be determined. Code element distances can also be determined "indirectly" by means of calculation of a difference of the distances of the relevant code elements to a common reference code element. Such a common reference code element can be, for example, the code element 20a. For example, if the distance of the two code elements 27a and 28a to one another is to be determined, firstly the respective distances of the code element 27a and 28a to the reference code element 20a is determined. The distance sought between the two code elements 27a and 28a is the value of the difference of the respective distances of the code elements to the reference code element.

To achieve higher precisions, in the case of optoelectronic detection of the code elements of a position code marking, the nonideal properties of real imaging systems, which result in distortions of the image, can be compensated for by a distortion correction. All imaging properties of projector and detector can be measured in this case in the scope of calibration processes known to a person skilled in the art (for example, a series of calibration recordings) and a mathematical model for describing these imaging properties can be generated therefrom.

Figure 5:
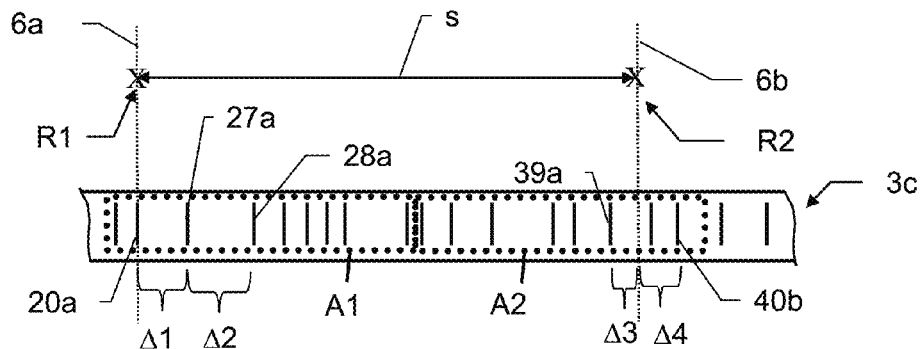
FIG. 5 shows schematic illustrations of refinements of the calibration method according to the invention.

FIG. 5 illustrates how such a determination of the precise position of a code element is additionally used to produce the reference to a detection reference point. In FIG. 5, the code element 39a is not located on the projection line 6b, which extends through the detection reference point R2, but rather at a distance Δ3 thereto. It is thus to be indicated that, depending on the standard s and the arrangement of the code elements 20 on the position code marking 3c, a code element 20 does not have to be located directly "at" a detection reference point R1 or R2, to be able to be detected in relation thereto. For example, for an optoelectronic detection of the code element 39a in relation to the detection reference point R2 in the reflected light method, the brightness peak of the code element 39a does not have to be located in the zero point of the detection region A2 of the photodetector, but rather can be detected at a certain distance thereto. By determining this distance, the relation to the zero point and therefore of the code element 39a to the detection reference point R2 can be established.

Such an establishment of a relation to a detection reference point can also be used for an alternative procedure in the case of the displacement of the read head to prepare a calibration comb. Instead of displacing the read head so that the same position of the position code marking 3c is located in the same position in relation to the detection reference point R1 as previously in relation to the detection reference point R2 (cf. FIGS. 3b and 3c), the read head can be displaced so that a code element 20 is detected, the offset of which from the leading detection reference point R2 is known by means of a distance measurement. In FIG. 5, this is the code element 40b, for example, the distance Δ4 of which to the detection reference point R2 is determined, or the code element 39a, the distance Δ3 of which to the detection reference point R2 is also determined. Accordingly, the distance of detected code elements 20, for example, the code element 39a, to the start code element 20a does not precisely correspond to an integer multiple, but rather the distance is reduced or increased by the respective distance to the detection reference point, for example, in the case of the code element 39a by the value Δ3. Accordingly, during the ascertainment of a calculated position value, a full standard s or multiple thereof is not added, but rather a length reduced or increased by the distance to the detection reference point.

FIG. 5 furthermore shows a determination of code element distances for the start code elements 20a, 27a, 28a of multiple calibration combs. All fourteen code elements, which are located within the standard s in this example, are used as the start code elements, so that the calibration combs K1 to K14 result. The distance between the start code elements 20a and 27a is Δ1, the distance between the start code elements 27a and 28a is Δ2. The distance is also determined for the further start code elements within the standard s. On the basis of these measured start code element distances, the start code elements can be placed in a position in relation to one another, whereby a linkage of the various calibration combs K1 to K14 can be performed by an equalization calculation. Instead of via the distances of the start code elements to one another, in a corresponding manner, a linkage of calibration combs can also be performed by determining the distances of the other code elements within a standard s, which are at least not all used as start code elements.

To further increase the calibration precision, according to the invention, calibrated position values can be determined for the start code elements on the basis of the measured distances to one another. The sum of the distances of the code elements 20 to one another within one standard s ideally corresponds to the standard s. In the example according to FIG. 5, these are the distances Δ1, Δ2, etc. of the start code elements 20a, 27a, etc. up to the start code element 39a and its distance Δ3 to the detection reference point R2. This distance sum is compared to the standard s and a deviation is determined. If there is no deviation or if it is less than a fixed threshold value, the deviation is zero. The deviation is used as the foundation for the determination of calibrated position values for the start code elements. These calibrated position values are then stored similarly to the steps 24a or 24b and 25 from FIG. 3d in the storage unit. If only a single start code element distance is determined within a standard s, for example, that of the start code element 20a to the start code element 39a, the one start code element distance is then accordingly compared to the standard s (in the example in consideration of the distance Δ3) and a deviation is determined via this. To ascertain the calibrated position values, for example, the deviation of the distance sum to the standard s can be averaged with respect to the number of the start code elements, in the example, thus divided by fourteen, and therefore an identically calibrated position value can be used for all start code elements. In particular, the steps for forming calibration combs and the linkage thereof and the steps for forming calibrated position values of the start code elements can be part of a single, shared calibration algorithm, so that calculated position values can be formed from the measured values of the calibration combs and the code element distances by considering them together. The determination of a deviation from a distance sum and the standard s can also be performed at any arbitrary point of the mass embodiment 3. In particular, the determination of a deviation can be performed in the scope of a measurement sequence of the linear encoder 100 and can be used as a measure of the quality of the position values measured in this case. If the deviation exceeds a specific amount in this case, the quality of the position values is no longer considered to be sufficient and a warning or calibration recommendation can be output to the user and/or a calibration can be carried out automatically by the linear encoder 100.

In particular in the case of unequal distances of the code elements to one another, as shown in FIG. 5, alternatively a weighting can be performed with respect to a single code element distance, and such a weighted calibrated position value can be ascertained for each start code element.

According to the invention, it is not necessary, for a calibration of the position code marking 3c, to detect all code elements 20 on the position code marking 3c or within a region thereof. A determination of distances of code elements can be used in a refinement of the calibration method to determine and store calibrated position values for those code elements 20 which were not detected during a comb formation. For example, if a calibrated position value has been determined for the detected code element 39a (step 24a in FIG. 3d), a calculated position value can be calculated for the code element 40b, which is adjacent at a known distance thereto, by adding the distance to the calibrated position value. Alternatively thereto, calibrated position values can be determined for non-detected code elements from the existing calibrated position values of detected code elements by way of interpolation methods known to a person skilled in the art or by forming one or more equalization functions.

Figure 6A:
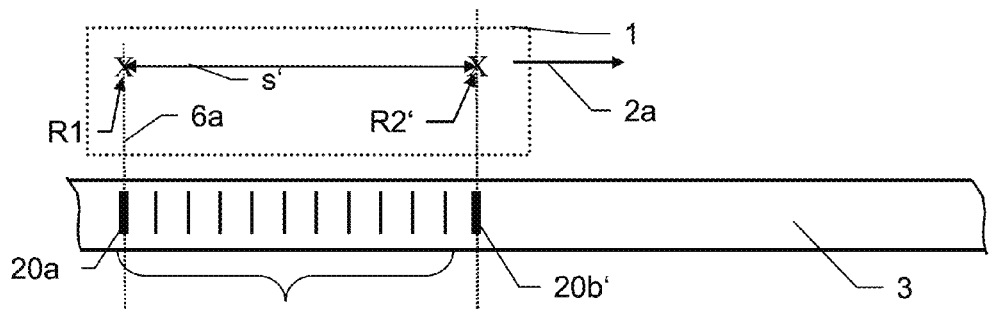
FIG. 6a-c shows schematic illustrations of the calibration method according to the invention.
Figure 6B:
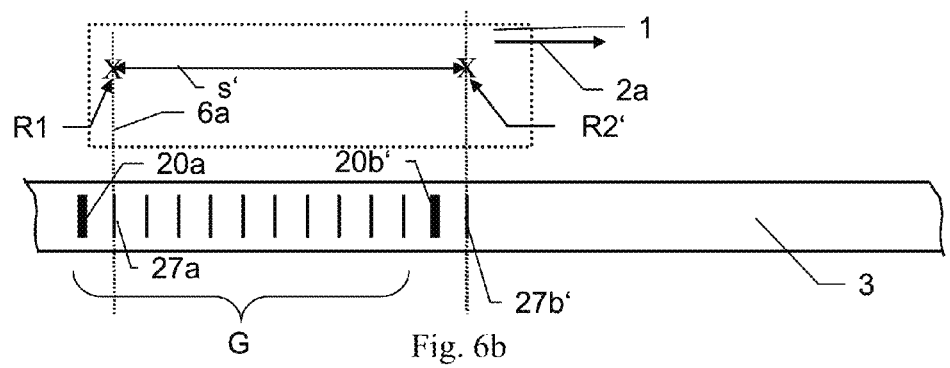
Figure 6C:
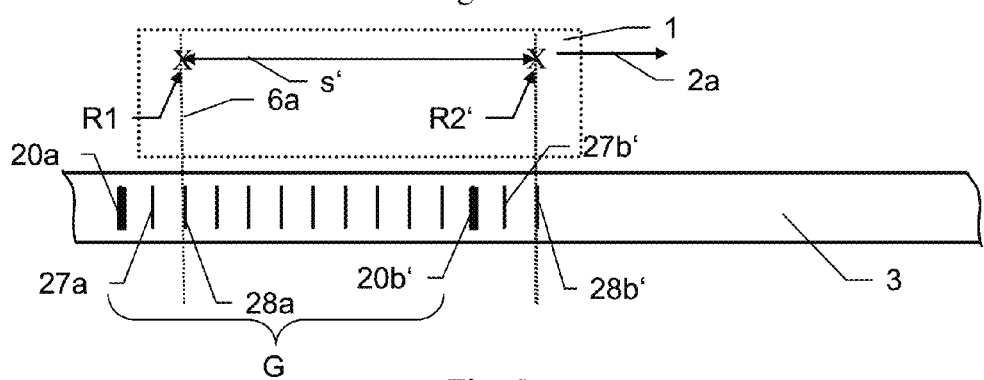

FIGS. 6a-c illustrate a refinement of the calibration method, in which code elements 20 have been written in calibrated form on the mass embodiment 3 by the read head 1 according to an embodiment as shown as an example in FIG. 2d. The mass embodiment 3 only has one group G of start code elements beforehand, which have already been calibrated at the producer or can be calibrated by the method according to the invention. The read head 1 has a read-write unit 4' having at least one detection reference point R1 of a sensor 6 and furthermore a write unit 30 having a write reference point R2', which are arranged so that the write reference point R2' is located leading in the movement direction 2a of the read head 1 at a write-read distance s' to the detection reference point R1. The write-read distance s' is established with high precision by a substrate 5 made of a dimensionally-stable and aging-stable material. Alternatively or additionally, the write-read distance s' is determined with high precision in its length by measuring at the producer or by measuring using a precision measuring unit of the read head 1 (not shown in FIG. 2d).

In a first step, the read head 1 is positioned in relation to the mass embodiment 3 so that a first start code element 20a of the group G is detected in relation to the detection reference point R1 of the sensor 6. In this first start position, a first code element 20b' is written by the write unit 30, which is located at the write-read distance s' determined or established with high precision to the sensor 6. Similarly to the procedure according to FIGS. 3a-c or FIGS. 4a-c, the distance of the two code elements 20a and 20b' to one another is established with high precision by the standard from the high precision write-read distance s'. If the standard is additionally known in its length, therefore, in the case of known position of the first start code element 20a (which can be established as the zero position), for example, the position of the code element 20b' is also known with high precision, by adding the write-read distance s' to the position of the first start code element 20a and storing it in the control and analysis unit 2.

In FIG. 6b, the read head 1 has been displaced in the direction 2a so that a code element adjacent to the first start code element 20a is detectable as the second start code element 27a by the sensor 6 in relation to the detection reference point R1. The second start code element 27a is now used as a starting point for writing a second code element 27b', by repeating the method steps in the same manner as described with respect to FIG. 6a. Similarly to the first start code element 20a and the first code element 20b' from FIG. 6a, the distance of the second code element 27b' to the second start code element 27a' is known or can be determined with high precision by the write-read distance s', which the standard defines.

FIG. 6c shows the subsequent step, during which, similarly to the preceding step, the read head 1 is displaced in relation to the mass embodiment 3 in the movement direction 2a until a third start code element 28a can be read by the sensor unit 4. In this third relative position, a third code element 28b' is written on the mass embodiment 3 by the write unit 30, the position of which can be calculated and stored on the basis of the high-precision write-read distance s' from the position of the third start code element 28a.

In a similar procedure, further code elements 20 are written by the read head 1 on the mass embodiment 3, in each case at the distance s' to the start code elements of the group G. If all start code elements of the group G have been detected by the sensor 6 by a correspondingly large displacement of the read head 1, the method is continued by displacing the read head 1 further along the movement direction 2a, so that the code elements 20b', 27b', 28b', etc., which were previously written according to the invention are detected in relation to the detection reference point R1 and further position code elements 20 are written in these respective positions by the write unit 30. In the further course of the method, the calibrated code elements 20 created by the write unit 30 are thus used as the starting point for further code elements 20 to be written. In particular, the method steps can be continued until the end of the mass embodiment 3 is reached. A position code marking 3c written in this manner forms a position code, which has already been calibrated during the writing of the code elements 20 because of the write-read distance s', which is established with high precision and advantageously also determined with high precision in its length, between detection reference point and write reference point.

What is claimed is:

1. A calibration method for a linear encoder, the linear encoder comprising:
   a control and analysis unit having storage unit and calibration functionality;
   a mass embodiment having a position code marking made of code elements; and
   a read head having a sensor unit, wherein read head and mass embodiment are movable in relation to one another, and wherein:
   at least two code elements are detectable in one step by means of the sensor unit;
   the sensor unit has at least one first, trailing detection reference point, and at least one second, leading detection reference point, which are fixed spaced apart from one another by means of a substrate, wherein a detection distance is established in each case between two detection reference points; and
   a calibration of the position code marking can be carried out by means of the read head using the at least one detection distance with the aid of the calibration functionality, wherein:
   the substrate is manufactured from a dimensionally-durable and aging-resistant material having a linear coefficient of thermal expansion having an absolute value in the range of 0 to at most $5 \cdot 10^{-6} K^{-1}$ and/or the read head has a precision measuring unit for the high-precision determination of the at least one detection distance with a relative error in the range of at most $5 \cdot 10^{-6}$;
   whereby the linear encoder is provided for the high-precision calibration with at least one standard, which is defined by the at least one detection distance, having a relative error in the range of at most $5 \cdot 10^{-6}$,
   whereby according to the method a first calibration comb is formed by the following steps:
   detecting in a first position of the read head a first code element as a start code element in relation to a trailing detection reference point and, in the same step, a second code element is detected in relation to a leading detection reference point;
   wherein the read head is displaced into a second position in relation to the mass embodiment until the second code element is detectable in relation to the trailing detection reference point;
   detecting the second code element in relation to the trailing detection reference point and, in the same step, a further code element is detected in relation to the leading detection reference point;

wherein the read head is displaced into further positions and the steps of displacing the read head into a second position in relation to the mass embodiment until the second code element is detectable in relation to the trailing detection reference point and of detecting the second code element in relation to the trailing detection reference point and detecting, in the same step, a further code element in relation to the leading detection reference point are repeated until the read head has reached a desired point of the mass embodiment or the last code element of the mass embodiment detectable in this manner, wherein:

in the course of the calibration method, the detection distance between the leading detection reference point and the trailing detection reference point is determined as a high-precision standard;

with the aid of the standard thus defined, calculated position values are calculated for the detected code elements; and calibrated position values are generated and stored based on the calculated position values.

2. The calibration method according to claim 1, wherein:
the high-precision determination of the standard is performed for each calibration especially by interferometry.

3. The calibration method according to claim 1, wherein:
the high-precision determination of the standard is performed before the final installation of the linear encoder.

4. The calibration method according to claim 1, wherein:
the calculated position values are calculated on the basis of a start position value assigned to the start code element and on the basis of the standard, wherein, for the calculation of a calculated position value for the second code element, a standard is added to that start position value, which is assigned to the start code element, and in each case a further standard is added for each following further code element of the first calibration comb.

5. The calibration method according to claim 1, wherein:
calculated position values are stored as calibrated position values; and/or
a calibration function, on the basis of which calibrated position values are determined and stored, is created on the basis of the calculated position values for at least one section of the position code marking; and/or
the difference between the calculated position value and a target position value stored in the storage unit is formed with respect to a detected code element, wherein the value of the difference is stored as a correction value and the combination of target position value and correction value is used as the calibrated position value.

6. The calibration method according to claim 1, wherein:
at least one further calibration comb is formed and the calibration combs are linked to one another, wherein the at least one further calibration comb is formed, proceeding from a further code element to be detected as a start code element, wherein the code element to be detected as the start code element, when the read head is located in the first calibration comb in its first position, is located within one standard on the mass embodiment, and in fact directly adjacent to the first start code element or, separated by other code elements, adjacent to the first start code element,
by repeating the method steps of the first calibration comb as follows:

detecting in a first position of the read head a first code element as a start code element in relation to a trailing detection reference point and, in the same step, a second code element is detected in relation to a leading detection reference point;

wherein the read head is displaced into a second position in relation to the mass embodiment until the second code element is detectable in relation to the trailing detection reference point;

detecting the second code element in relation to the trailing detection reference point and, in the same step, a further code element is detected in relation to the leading detection reference point;

wherein the read head is displaced into further positions and the steps of displacing the read head into a second position in relation to the mass embodiment until the second code element is detectable in relation to the trailing detection reference point and of detecting the second code element in relation to the trailing detection reference point and detecting, in the same step, a further code element in relation to the leading detection reference point are repeated until the read head has reached a desired point of the mass embodiment or the last code element of the mass embodiment detectable in this manner, wherein:

in the course of the calibration method, the detection distance between the leading detection reference point and the trailing detection reference point is determined as a high-precision standard;

with the aid of the standard thus defined, calculated position values are calculated for the detected code elements; and calibrated position values are generated and stored based on the calculated position values.

7. The calibration method according to claim 6, wherein:
code element distances between adjacent code elements are measured and
the measured code element distances are used to link the calibration combs with one another by way of an equalization calculation; and/or
the measured code element distances are used to determine a calibrated position value for an adjacent code element proceeding from a calculated position value of a code element.

8. The calibration method according to claim 7, wherein:
the standard is used during the measurement operation to check the precision of the position code marking.

9. The calibration method according to claim 1, wherein:
the detecting of code elements is optoelectronic or capacitive-electronic detecting.

10. The calibration method according to claim 1, wherein:
the detecting of code elements is magnetic-electronic or inductive-electronic detecting.

11. The calibration method according to claim 1, wherein:
a determination of calibrated position values for at least some code elements on the basis of at least two standards on the basis of at least two different standards, wherein especially one of the at least two standards is a first standard and a further standard is a second standard and the second standard is not an integer multiple of the first standard.

12. One or more non-transitory computer-readable media storing one or more programs that are configured, when executed, to cause one or more processors to execute the method as recited in claim 1.

13. A linear encoder comprising:
a control and analysis unit having storage unit and calibration functionality, programmed to perform the calibration method according to claim 1;
a mass embodiment having a position code marking made of code elements; and
a read head having a sensor unit, wherein read head and mass embodiment are movable in relation to one another, and wherein:
at least two code elements are detectable in one step by means of the sensor unit;
the sensor unit has at least one first, trailing detection reference point, and at least one second, leading detection reference point, which are fixed spaced apart from one another by means of a substrate, wherein a detection distance is established in each case between two detection reference points; and
a calibration of the position code marking can be carried out by means of the read head using the at least one detection distance with the aid of the calibration functionality, wherein:
the substrate is manufactured from a dimensionally-durable and aging-resistant material having a linear coefficient of thermal expansion having an absolute value in the range of 0 to at most $5 \cdot 10^{-6} K^{-1}$ and/or the read head has a precision measuring unit for the high-precision determination of the at least one detection distance with a relative error in the range of at most $5 \cdot 10^{-6}$;
whereby the linear encoder is provided for the high-precision calibration with at least one standard, which is defined by the at least one detection distance, having a relative error in the range of at most $5 \cdot 10^{-6}$.

14. The linear encoder according to claim 13, wherein:
the standard is at least sufficiently greater than the distance of code elements to one another that in each case multiple, but at least two code elements are located on the mass embodiment within the length of one standard; and/or
the sensor unit has at least two detection regions each having one detection reference point, wherein each detection region is designed to detect at least two code elements in one step.

15. The linear encoder according to claim 13, wherein:
the sensor unit has a:
line sensor or surface sensor having at least two detection regions each having a detection reference point
or
at least two single sensors in the form of:
spot sensors each having one detection reference point
and/or line and/or surface sensors each having one detection region each having one detection reference point;
and the control and analysis unit is configured such that the distances to one another can be determined of code elements, which are detected in one detection region.

16. The linear encoder according to claim 13, wherein:
if a precision measuring unit is provided, the high-precision determination of the at least one detection distance is performed optoelectronically, wherein the precision measuring unit is implemented as an interferometer, especially as a laser interferometer.

17. The linear encoder according to claim 13, wherein:
the absolute value of the coefficient of thermal expansion of the substrate material is, at least within a temperature range of 253K to 343K, in the range of 0 to $1 \cdot 10^{-6} K^{-1}$.

18. The linear encoder according to claim 13, wherein:
the absolute value of the coefficient of thermal expansion of the substrate material is, at least within a temperature range of 283K to 303K, in the range of 0 to $6 \cdot 10^{-6} K^{-1}$.

19. The linear encoder according to claim 13, wherein:
the sensor unit has at least three different spaced-apart detection reference points, wherein at least two different standards of different sizes are defined, wherein one of the at least two standards is a first standard and a further standard is a second standard and the second standard is not an integer multiple of the first standard.

* * * * *